United States Patent [19]

Nagata

[11] Patent Number: 4,588,273
[45] Date of Patent: May 13, 1986

[54] INFORMATION INPUT DEVICE FOR A CAMERA

[75] Inventor: Toru Nagata, Kanagawa, Japan

[73] Assignee: Canon Kabushiki Kaisha, Tokyo, Japan

[21] Appl. No.: 668,743

[22] Filed: Nov. 6, 1984

[30] Foreign Application Priority Data

Nov. 11, 1983 [JP] Japan .................. 58-210958

[51] Int. Cl.⁴ .............................................. G03B 7/24
[52] U.S. Cl. .................................. 354/21; 354/289.1
[58] Field of Search .......... 354/21, 286, 289.1, 354/217, 218

[56] References Cited

U.S. PATENT DOCUMENTS

| | | | |
|---|---|---|---|
| 3,636,847 | 1/1972 | Akasaka | 354/21 |
| 4,200,371 | 4/1980 | Suzuki et al. | 354/21 |
| 4,431,283 | 2/1984 | Hoda et al. | 354/21 |
| 4,448,509 | 5/1984 | Katsuma et al. | 354/289.1 |
| 4,457,608 | 7/1984 | Komoto et al. | 354/286 |
| 4,550,991 | 11/1985 | Ishizaka et al. | 354/21 |

FOREIGN PATENT DOCUMENTS 52-2522  1/1977  Japan .

Primary Examiner—Russell E. Adams
Attorney, Agent, or Firm—Toren, McGeady, Stanger, Goldberg & Kiel

[57] ABSTRACT

An information input device for a camera including a contact disposed in the vicinity of a patrone chamber in contact with the outer circumference of a patrone (film cartridge), a protecting member which moves between at least a first position for protecting the contact and a second position for exposing the contact, and a moving device for moving the protecting member between at least the first and the second positions according to an exposure operation of the camera. The protecting member slides over a contact area which is in contact with the patrone during its moving process between the first and the second positions.

16 Claims, 6 Drawing Figures

F I G. 1A
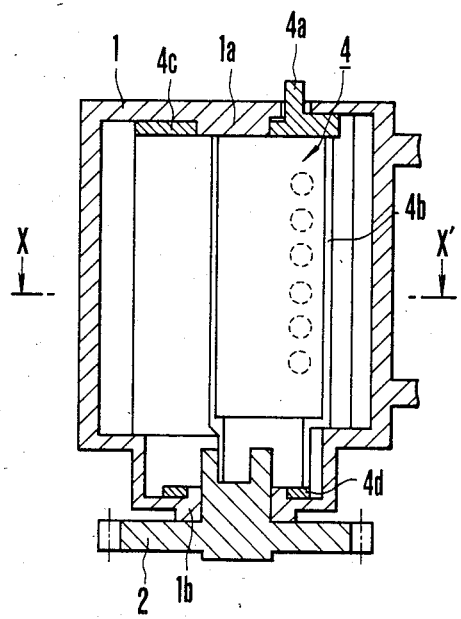
F I G. 1B
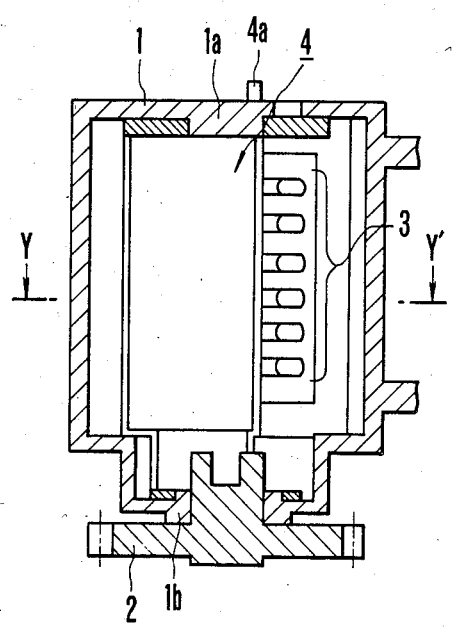

INFORMATION INPUT DEVICE FOR A CAMERA

BACKGROUND OF THE INVENTION

1. Field of the Invention:

The present invention relates to the improvement of information input means for introducing information into a camera using electrical codes provided on an outer circumference of a patrone (film cartridge).

2. Description of the Prior Art:

Heretofore, a device to provide information such as film sensitivity and the number of frames exposed, etc. in the form of electrical codes on an outer circumference of a patrone (film cartridge) and to read out the information by a contact provided in the vicinity of a patrone chamber, has been known, for example, from Japanese Laid-Open Patent Application No. SHO 52-2522, etc. Also, recently film placed in a patrone which itself actually has such electrical codes as those mentioned above, for example, a DX system has been introduced in the market by Eastman Kodak Company of the USA.

However, when the contact pressure of such a contact is increase, the posture of the patrone within a patrone chamber will be influenced undesirably, and as the number of contacts increases such an undesirable influence increases as well. This may result in a contact failure of the contacts themselves, and therefore the contact pressure of the contact must be reduced. For this reason, such a contact is made to be easily deformed by the simple touch of a finger and cannot break the oxidation films formed over its contact point by its own contact pressure. Thus it is apt to have a contact failure or an increase in contact resistance.

SUMMARY OF THE INVENTION

The first object of the present invention is to eliminate the above shortcomings of the conventional device, and to provide an information input device for a camera, in which information can be introduced thereinto through electrical codes provided on the outer circumference of a patrone, said device comprising a contact provided at a patrone chamber for introducing information of the electrical codes, and a protecting member which moves between a position for protecting the contact and a position for exposing the same, in which the contact is protected by the protecting member from the touch of a finger when a back lid is opened, and a cleaning of the contact portions of the contact takes place in association with the above moving action of the protecting member, so that a deformation of the contact by the touch of a finger or a contact failure due to an oxidation film will not take place even if a contact pressure of the contact is small.

Other objects of the present invention will become apparent from the following detailed description of the preferred embodiments thereof with reference to the drawings.

BRIEF DESCRIPTION OF THE DRAWINGS

FIGS. 1A and 1B are longitudinal sectional views of a patrone chamber according to the present invention, FIG. 1A showing a state in which a protecting member is protecting a contact, FIG. 1B showing a state in which the protecting member exposes the contact.

FIG. 2B shows a state in which a patrone is being housed.

DETAILED DESCRIPTION OF THE PREFERRED EMBODIMENTS

Now, embodiments of the present invention will be described in detail with reference to the drawings.

Figure 2A:
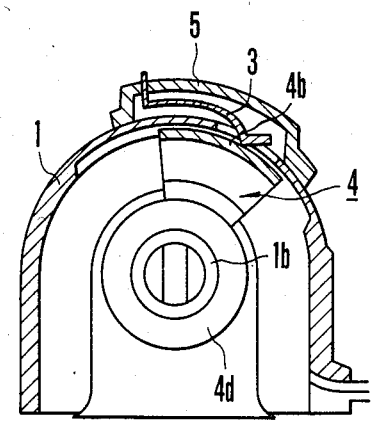
FIGS. 2A and 2B are transverse sectional views of FIGS. 1A and 1B, FIG. 2A corresponding to FIG. 1A and FIG. 2B corresponding to FIG. 1B, but only
Figure 2B:
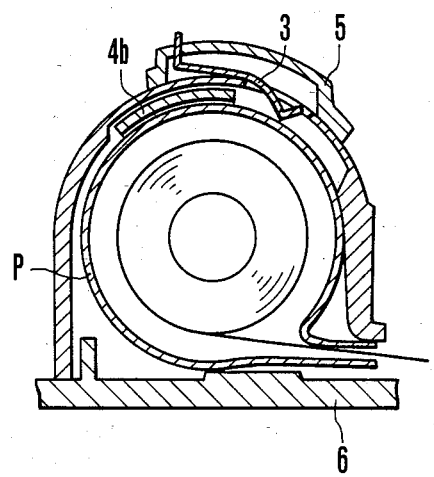

FIGS. 1A and 1B, as well as FIGS. 2A and 2B are sectional views of a patrone chamber which has a contact for introducing information from electrical codes provided on a patrone and a protecting member for protecting the contact. FIGS. 1A and 1B are longitudinal sectional views and FIGS. 2A and 2B are transverse sectional views taken along lines X—X' and Y—Y' of FIGS. 1A and 1B, respectively.

FIG. 1A and FIG. 2A show a state in which the contact is protected by the protecting member, while FIG. 1B and FIG. 2B show a state in which the contact is exposed or is in contact with the patrone (FIG. 2B only shows a state in which the patrone is being housed). In these drawings, 1 is a camera body in which a patrone chamber is formed, and 2 is a rewinding fork and a fork gear connected to a motor which is a driving source at the time of rewinding. 3 are contact pieces acting as contact means to read out electrical codes provided on a side of the patrone. 4 is a protecting member for the contact pieces 3 and includes rotating parts 4c and 4d which are inserted into shaft parts 1a and 1b, respectively, provided within a film supply chamber of the camera body in a rotatable manner, and a contact plane 4b against the contact pieces 3 having an arc shape cross section and connecting the rotating parts 4c and 4d. The protecting member 4 has an arrangement such that a driving pin 4a which is provided on the rotating part 4c is moved by a driving mechanism (to be described later), thus moving between a position which shields and protects the contact pieces 3 (FIG. 1A) and a position which exposes them (FIG. 1B). The contact plane 4b against the contact pieces 3 of the protecting member 4 slides over the contact points of the contact pieces 3 and a position away from the same at the time of the movement between the positions. The contact points of the contact pieces 3 can have their stains and oxidation film, etc. removed by the movement of the contact plane 4b against the contact pieces 3 and therefore, will be maintained in a clean and clear state. As a result, a satisfactory contact state in a case when a patrone P is loaded as shown in FIG. 2B can be maintained with a small amount of contact pressure (as small as 10 grams or less) even if the contact pressure of the contact pieces 3 are not made large enough for self-breaking of oxidation film, etc.

Next, a description will be set forth of a driving mechanism for the protecting member 4.

Figure 3:
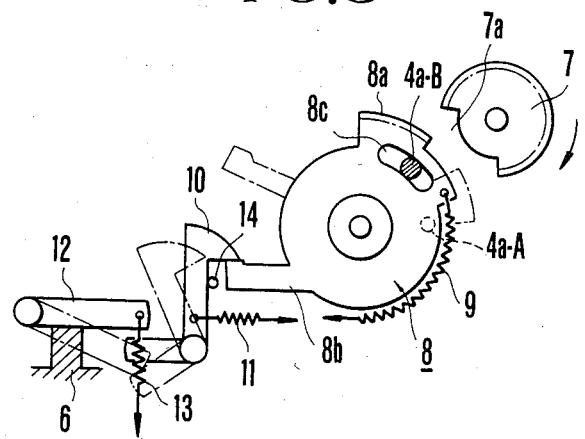
FIG. 3 is a schematic view showing an embodiment of a driving mechanism for the protecting member shown in FIGS. 1A and 1B as well as in FIGS. 2A and 2B.

FIG. 3 shows an embodiment of a driving mechanism for the protecting member 4. 7 is a notched gear associated with a known type of one-frame mechanism, that makes one rotation for each frame of film wound, and 8 is a sector gear meshing with the notched gear 7 via its gear part 8a and being made to move a driving pin 4a which is freely inserted into a slot 8c of the sector gear 8. The notched gear 7 is stopped at a position as shown by a solid line in the drawing at the time when the film winding process has stopped, and its notched part 7a has a size such that it allows for passage of the gear part 8a of the sector gear 8 through the above position. 9 is a spring to urge the sector gear 8 in the clockwise direction, and 10 is a bell crank to latch the sector gear 8 at the position shown in the drawing, while 11 is a spring to urge the bell crank 10 in the clockwise direction. A stopper 14 stops the bell crank 10 from rotating excessively in the clockwise direction by the spring 11, and 12 is a control lever which is associated with the opening and closing of the back lid 6 and controls the posture of the bell crank 10. 13 is a spring to urge the control lever 12 in the clockwise direction, and is made to rotate the bell crank 10 in the counterclockwise direction, thus overcoming the force to urge the bell crank 10 in the clockwise direction by the spring 11. FIG. 3 shows a state in which the back lid 6 is closed and the control lever 12 is pushed by the back lid 6 and rotates in the counterclockwise direction against the urging force of the spring 13. By this, the bell crank 10 rotates in the clockwise direction urged by the spring 11 and comes to a position at which it can check the projection 8b of the sector gear 8 against the force of the spring 9. Therefore, when the winding action takes place for one frame of film, the gear part 8a of the sector gear 8 engages with the notched gear 7 and rotates, which rotates the sector gear 8 in the counterclockwise direction to a position shown in solid line, and the bell crank 10 engages with the projection 8b to check the sector gear 8. At this time the driving pin 4a is moved from a position 4a-A to a position 4a-B by the counterclockwise rotation of the slot 8c, thus shifting from a state shown in FIGS. 1A and 2A for shielding and protecting the contact pieces 3, to a state shown in FIGS. 1B and 2B for exposing the contact pieces 3, and effects a cleaning of the contact portions of the contact pieces 3 during the above process.

In a subsequent winding of the film, the gear part 8a of the sector gear 8 engages with the notched gear 7 only for an over-charged portion, but the drive pin 4a will not be moved because of an extra space in the slot 8c, and therefore, the protecting member 4 can be left unmoved. Thus, contact between the contact pieces 3 and the electric codes provided on the patrone P can be maintained satisfactorily as shown in FIG. 2B. Here, when the back lid 6 is opened, the control lever 12 is rotated by the urging force of the spring 13, in the clockwise direction to a position as shown by one dot chain line, and the rotating force is transmitted to the bell crank 10, thus rotating the bell crank 10 in the counterclockwise direction against the urging of the spring 11 to a position as shown by one dot chain line, whereby checking of the projection 8b of the sector gear 8 by the bell crank 10 is released. Then, the sector gear 8 rotates in the clockwise direction by the urging force of the spring 9 to a position as shown by one dot chain line, and the driving pin 4 is moved from the position 4a-B to the position 4a-A by the rotation of the slot 8c in the same direction. That is, the protecting member 4 moves from a position shown in FIGS. 1B and 2B to a position shown in FIGS. 1A and 2A, thus protecting the contact pieces 3 from being touched by a finger, and at the same time, the contact plane 4b of the protecting member 4 slides over the contact pieces 3 for cleaning the surfaces of the contact pieces 3.

Also, when the winding action is performed with the back lid 6 opened, the position of the protecting member 4 will be shifted from that of FIGS. 1A and 2A to that of FIG. 1B as in an action when the back lid 6 is closed, but since the projection 8b is not checked by the bell crank 10 at the position of one dot chain line, the sector gear 8 rotates by the spring 9 from the position of the solid line shown in the drawing to the position of the one dot chain line in the clockwise direction at a time when the gear part 8a and the notched gear 7 become unmeshed as shown in the drawing. Therefore, the protecting member 4 returns once more to the state as shown in FIGS. 1A and 2A from the state as shown in FIG. 1B. And when the back lid 6 is closed again under the above state, the state shown in FIGS. 1B and 2B will be resumed as in the above mentioned case after the winding of one frame, and thereafter the above state will be maintained until the back lid 6 is opened.

Figure 4:
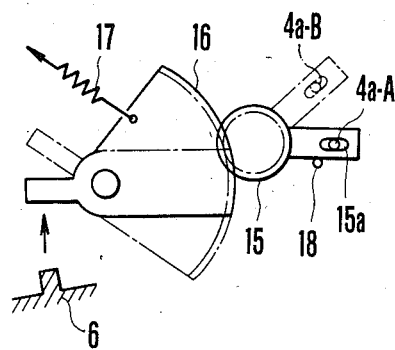
FIG. 4 is a schematic view showing another embodiment of a driving mechanism for the protecting member shown in FIGS. 1A and 1B as well as in FIGS. 2A and 2B.

FIG. 4 shows another embodiment of a driving mechanism which includes a sector gear 16 associated with the opening and closing of the back lid 6, a spring for urging the gear 16 in the counerclockwise direction, a driving gear 15 meshing with the sector gear 16, and a projection 15a provided on the gear 15. Also, the driving pin 4a is freely inserted into a slot within the projection 15a. Under a state when the back lid 6 is opened, the sector gear 16 rotates in the counterclockwise direction by a spring 17, and by this the driving gear rotates in the clockwise direction and the projection 15a is placed at a position where it abuts onto a stopper 18. At this time the driving pin 4a is placed at a position 4a-A and the protecting member 4 is placed in a state as shown in FIGS. 1A and 2A in which the contact pieces 3 are exposed. When the back lid 6 is closed, the sector gear 16 being pushed thereby against the force of the spring 17 will rotate in the clockwise direction, then the driving gear 15 and the projection 15a rotate along therewith in the counterclockwise direction and are placed at a position as shown by the one dot chain line in the drawing. At this time the driving pin 4a is also moved from the position 4a-A to the position 4a-B, and the protecting member 4 is placed in a state which shields and protects the contact pieces 3.

The action to effect an opening and closing of the protecting member may be associated not only with the opening and closing of a back lid 6 but also with any action related to the taking of a photograph, for example, a release action or the opening and closing of a lens barrier.

As has been described above, the present invention has provided, within a patrone chamber, a protecting member which is opened and closed as it slides over contact portions of contact pieces for introducing information, and therefore even if the contact pressure of the contact pieces for introducing information is decreased, in order to secure the stability of the patrone and a satisfactory contact state of the contact pieces, deformation of the contact pieces, by the touch of a finger thereon and formation of an oxidation film on the pieces and stain of the pieces, etc. which could lead to a failure in conductance, can be prevented. Thus, the invention has a high level of usefulness.

Further, since the opening and closing of the protecting member is associated with a photo-taking action, an erroneous operation or a decrease in maneuverbility due to a failure in actuating of the same as a photographer forgets to open or close the member can be prevented.

What is claimed is:

1. An information input device for a camera, comprising:
   (A) signal input means provided at a film cartridge chamber of the camera; and
   (B) shielding means changeable between at least two states including a first state in which said shielding means shields said signal input means and a second state in which said shielding means exposes said signal input means.

2. A device according to claim 1, further comprising change-over means for changing said shielding means between said first state and said second state in association with an operation related to the taking of a photograph.

3. A device according to claim 2, wherein said change-over means includes back lid associated means for changing said shielding means in association with an opening operation of a back lid of the camera from said second state to said first state.

4. A device according to claim 2, wherein said change-over means includes film winding associated means for changing said shielding means in association with the winding of film from said first state to said second state.

5. A device according to claim 4, wherein said change-over means further includes return means for changing said shielding means, which has been changed over from said first state to said second state by said film winding associated means as the back lid is opened, again to said first state.

6. A device according to claim 1, wherein said signal input means includes a contact piece having a weak contact pressure.

7. A device according to claim 6, wherein said contact piece is arranged to come into contact with signal codes provided on an outer circumference of a film cartridge when said patrone is loaded.

8. An information input device for a camera, comprising:
   signal input means provided at a film cartridge chamber of the camera; and
   shielding means changeable between at least two states including a first state in which said shielding means shields said signal input means and a second state in which said shielding means exposes said signal input means, said shielding means being arranged to slide along a side wall of said patrone chamber.

9. An information input device for a camera, comprising:
   signal input means provided at a film cartridge chamber of the camera; and
   shielding means changeable between at least two states including a first state in which said shielding means shields said signal input means and a second state in which said shielding means exposes said signal input means;
   said signal input means including contact means and said shielding means including cleaning means for cleaning contact portions of said contact means in the process of changing said shielding means.

10. An information input device for a camera, comprising:
    contact means for receiving a signal;
    cleaning means movable between at least a first position and a second position for cleaning said contact means during the process of said movement, and
    operation associated means for moving said cleaning means in association with an operation related to the taking of a photograph between said first position and said second position;
    said operation associated means including back lid associated means for moving said cleaning means in association with the opening and closing of a back lid of the camera between said first position and said second position.

11. An information input device for a camera, comprising:
    contact means for receiving a signal;
    cleaning means movable between at least a first position and a second position for cleaning said contact means during the process of said movement, and
    operation associated means for moving said cleaning means in association with an operation related to the taking of a photograph between said first position and said second position;
    said operation associated means including film winding associated means for moving said cleaning means in association with the winding of film between said first and said second position.

12. An information input device for a camera, comprising:
    contact means for receiving a signal;
    cleaning means movable between at least a first position and a second position for cleaning said contact means during the process of said movement, and
    said contact means being provided at a film cartridge chamber of the camera.

13. A device according to claim 12, wherein said contact is arranged to come into contact with signal codes provided on an outer circumference of a patrone (film cartridge) when said patrone is loaded.

14. An information input device for a camera, comprising:
    signal input means for receiving a signal;
    cleaning means for cleaning said signal input means; and
    operation associated means for actuating said cleaning means in association with an operation related to the taking of a photograph;
    said operation associated means including back lid associated means for actuating said cleaning means in association with the opening and closing of a back lid of the camera.

15. An information input device for a camera, comprising:
    signal input means for receiving a signal;
    cleaning means for cleaning said signal input means; and
    operation associated means for actuating said cleaning means in association with an operation related to the taking of a photograph;
    said operation associated means including film winding associated means for actuating said cleaning means in association with the winding of film.

16. An information input device for a camera, comprising:
    signal input means for receiving a signal;
    cleaning means for cleaning said signal input means; and operation associated means for actuating said cleaning means in association with an operation related to the taking of a photograph; said signal input means being provided at a film cartridge chamber of the camera.

* * * * *